United States Patent [19]

Miyaguchi et al.

[11] Patent Number: 4,510,578

[45] Date of Patent: Apr. 9, 1985

[54] SIGNAL ENCODER USING ORTHOGONAL TRANSFORM

[75] Inventors: Hiroshi Miyaguchi, Yokohama; Hisaharu Takeuchi, Kawasaki, both of Japan

[73] Assignee: Tokyo Shibaura Denki Kabushiki Kaisha, Kawasaki, Japan

[21] Appl. No.: 352,236

[22] Filed: Feb. 25, 1982

[30] Foreign Application Priority Data

Mar. 4, 1981 [JP] Japan .................................. 56-31042

[51] Int. Cl.³ .......................................... G06F 15/332
[52] U.S. Cl. ..................... 364/725; 358/138
[58] Field of Search ................. 364/725, 826; 358/31, 358/133, 138, 160, 260; 382/43

[56] References Cited

U.S. PATENT DOCUMENTS

| 3,920,974 | 11/1975 | Means | 364/725 |
| 4,055,756 | 10/1977 | Jolivet et al. | 364/725 |
| 4,189,748 | 2/1980 | Reis | 358/133 |
| 4,196,448 | 4/1980 | Whitehouse et al. | 364/725 |
| 4,389,673 | 6/1983 | Despois et al. | 358/160 |

Primary Examiner—David H. Malzahn

Attorney, Agent, or Firm—Oblon, Fisher, Spivak, McClelland & Maier

[57] ABSTRACT

The invention provides an encoder for subjecting an input signal to the orthogonal transform for band compression and encoding. The encoder has a sample and hold circuit which samples the input signal at a sampling frequency three times that of the input signal, and an orthogonal transform unit which subjects the sampled signal to the orthogonal transform using as a coefficient an orthogonal matrix function of the order of 3n (where n is an integer of 2 or more) having as a minor matrix an orthogonal matrix of the order of 3:

$$\begin{pmatrix} a & a & a \\ b & 0 & -b \\ c & -2c & c \end{pmatrix}$$

having given numbers a, b and c as matrix elements. By maintaining the sampling frequency low, the frequency components of the input signal may be concentrated in a small number of transform outputs without causing an increase in the amount of data to be processed, without using a multiplier and without requiring an increase in the processing speed. The input signal is thus effectively band compressed and encoded.

8 Claims, 21 Drawing Figures

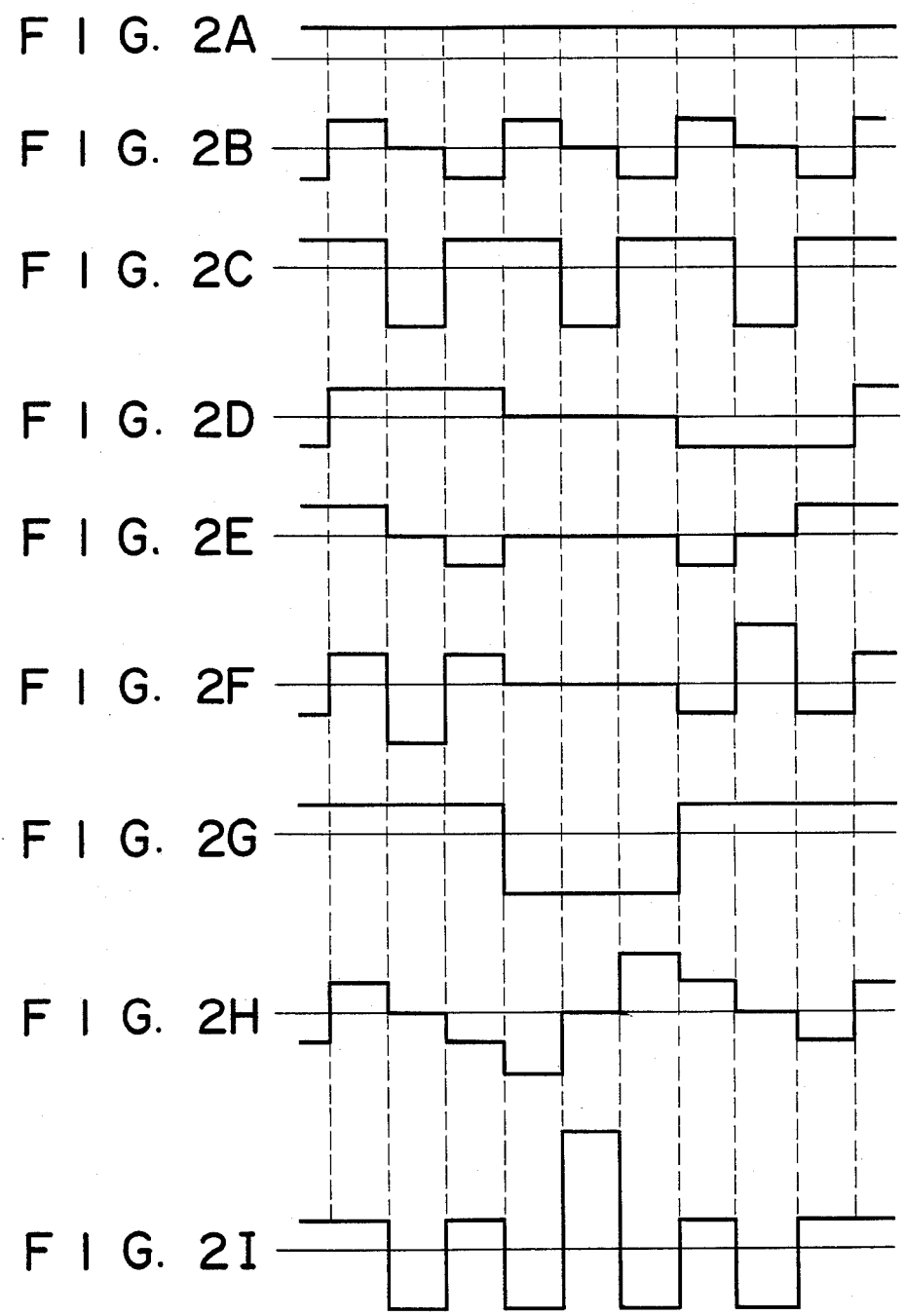

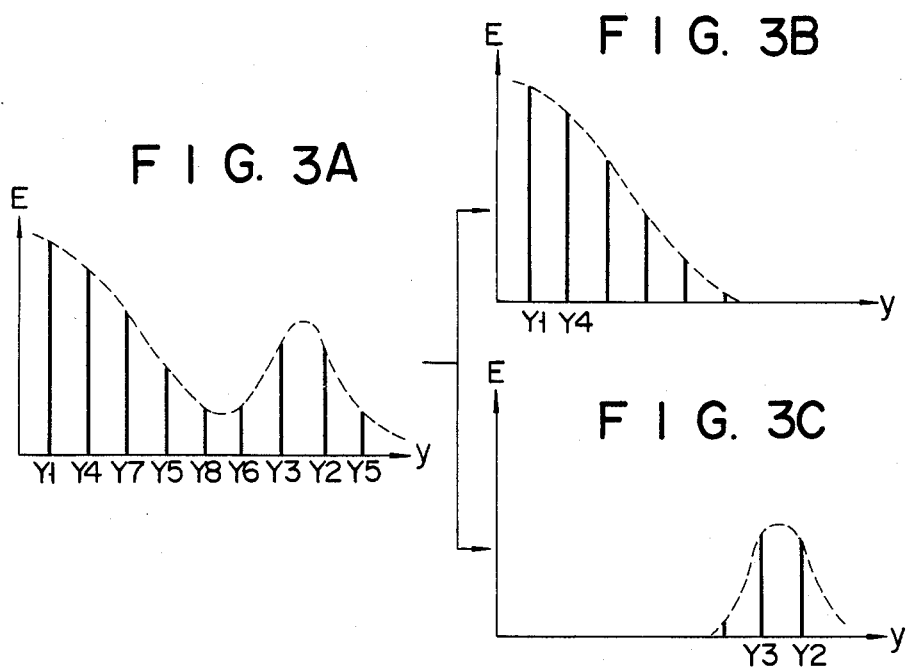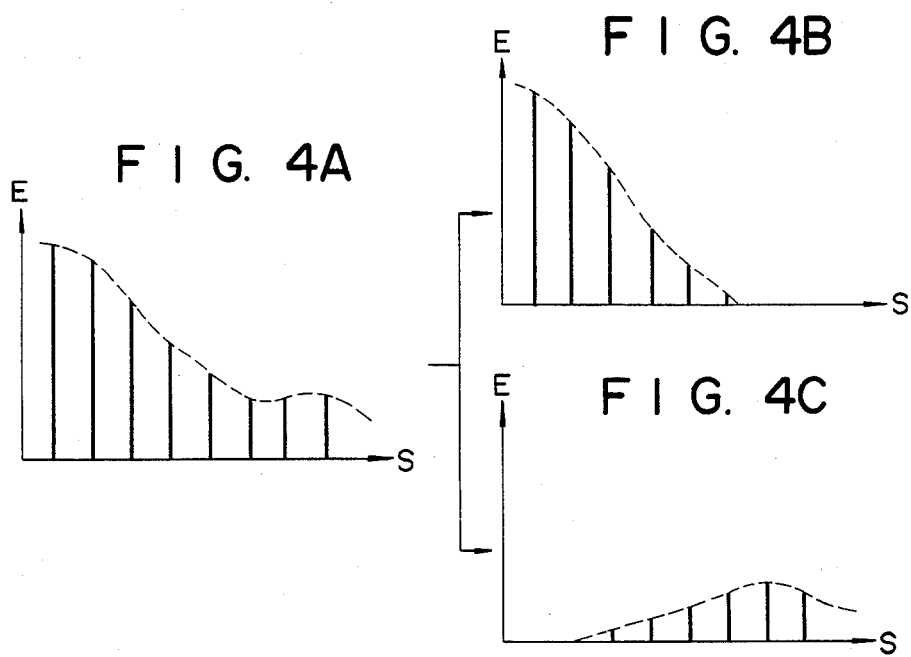

SIGNAL ENCODER USING ORTHOGONAL TRANSFORM

BACKGROUND OF THE INVENTION

The present invention relates to an encoder for the orthogonal transform of, for the band compression of and for the encoding of sampled signals containing components of a frequency one-third of the sampling frequency, for example, color television signals obtained by sampling at a frequency three times the color subcarrier frequency.

The orthogonal transform is widely adopted in the analysis or band compression of various kinds of signals. Typical examples of the orthogonal transform include the Fourier transform, sine transform, cosine transform, Haar transform, Hadamard transform, Karhunen-Loeve (K-L) transform and so on.

However, in the K-L transform, a convariance matrix of the transform matrix must be obtained prior to the transform. Thus, the K-L transform is not suitable for signal processing at high speed. The Fourier transform, sine transform and cosine transform provide wide application since the order of orthogonal transform may be freely selected. However, with these types of transforms the set of elements of the transform matrix is complex. Therefore, these types of transforms are not suitable for orthogonal transforms of higher order. On the other hand, in the Haar transform or Hadamard transform, the set of elements of the transform matrix is represented by 0 and $\pm 1$, so that the orthogonal transform of signals is very easy. For this reason, the Haar transform or Hadamard transform is conventionally widely adopted as the orthogonal transform. However, the order of the transform matrix of the Haar transform or Hadamard transform is limited to $2^m$ (where m is a positive integer) and, does not allow the orthogonal transform of the order of 3, 6 and 9.

Various types of processing of television signals are generally performed after sampling the television signals at a sampling frequency which is four times the color subcarrier frequency fsc. As may be understood from the sampling theorem, if the signals are sampled at a frequency which is twice or more the maximum frequency of the signals, the data of the signals may not be lost. Therefore, instead of sampling at a frequency which is four times the color subcarrier frequency fsc as described above, it is possible to sample at a frequency which is three times the color subcarrier frequency. Furthermore, if the frequency three times the color subcarrier frequency fsc is used as the sampling frequency, the amount of data to be handled decreases to $\frac{3}{4}$ as compared to the case of the sampling frequency which is four times the color subcarrier frequency. In addition, the processing speed for sampling, A/D conversion and so on can be decreased. For this reason, the signal processing system may be made simple in construction. However, as for the orthogonal transform of the signals obtained by sampling in this manner, the Haar transform or the Hadamard transform is not suitable since the order of transform is limited to $2^m$. In order to subject the signals sampled at a sampling frequency three times the frequency of the signals to the orthogonal transform, it is preferable to perform the orthogonal transform of degree 3n.

If the signals sampled at a frequency four times that of the signals are subjected to the orthogonal transform using an Hadamard matrix of order 4 as a coefficient, the frequency components of the signals concentrate in two particular orthogonal transform outputs and are not obtained at other orthogonal transform outputs. The band compression of the signals can be performed utilizing this fact. However, if the signals sampled at a frequency three times that of the signals are subjected to the orthogonal transform using an Hadamard matrix of degree 4 as a coefficient, the frequency components of the signals disperse in all of the orthogonal transform outputs. If the frequency components of the signals disperse in a number of orthogonal transform outputs by the orthogonal transform, the band compression of the signals may no longer be performed. Therefore, it has thus been strongly desired to develop a method and encoder for the orthogonal transform of, for the band compression and encoding of signals which are sampled at a sampling frequency three times that of the signals subjected to the orthogonal transform.

SUMMARY OF THE INVENTION

It is an object of the present invention to provide an encoder which is capable of performing the orthogonal transform of signals containing components of the frequency which is $\frac{1}{3}$ of the sampling frequency, for example, color television signals sampled at a sampling frequency three times a color subcarrier frequency, so that band compression and encoding of the signals may be performed by concentrating the frequency components of the signals described above to a smaller number of orthogonal transform outputs.

According to the present invention, there is provided an encoder comprising a sampling unit which samples an input signal at a sampling frequency three times the frequency of the input signal; and an orthogonal transform unit which performs the orthogonal transform of the sampled signal using as a coefficient an orthogonal matrix function of degree 3n (where n is an integer larger than unity), an orthogonal matrix of order of 3 having given numbers a, b and c as matrix elements:

$$\begin{pmatrix} a & a & a \\ b & 0 & -b \\ c & -2c & c \end{pmatrix}$$

being a basic or minor matrix. The present invention thus provides an encoder which is capable of performing effective band compression and encoding of input signals by concentrating the frequency components of the input signals described above to only a small number of orthogonal transform outputs.

BRIEF DESCRIPTION OF THE DRAWINGS

FIGS. 2A to 2I show function characteristics of an orthogonal transform of degree 9;

FIGS. 3A to 3C show the spectrum characteristics of a television signal obtained by the orthogonal transform by the encoder of the present invention;

FIGS. 4A to 4C show the frequency spectrum characteristics of a television signal obtained by the Hadamard transform of the order of 8;

DETAILED DESCRIPTION OF THE PREFERRED EMBODIMENTS

Figure 1A:
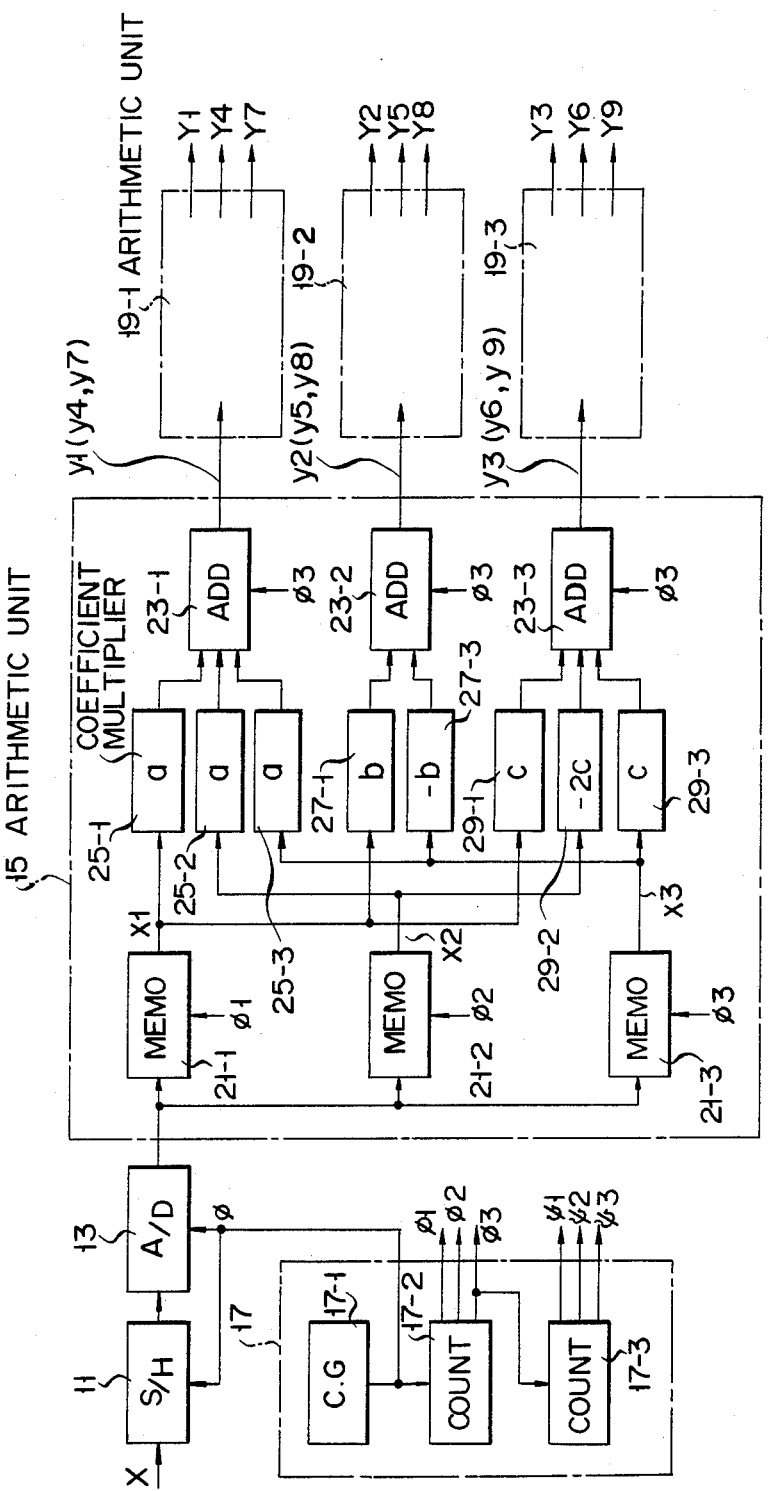
FIG. 1A is a block diagram of an encoder for performing the orthogonal transform of degree 9 according to the present invention.

Referring to FIG. 1, an input signal x to be subjected to the orthogonal transform, for example, a television signal is sampled by a sample-and-hold (S/H) circuit 11. Each sampled signal is converted into an m-bit digital signal by an A/D converter 13, which is supplied to a first arithmetic unit 15. The S/H circuit 11 and the A/D converter 13 operate in synchronism with each other in response to a clock signal $\phi$ generated by a clock signal generator 17. The frequency of the clock signal $\phi$ generated by the clock signal generator 17 is set to be three times the frequency of the input signal x. In other words, the clock signal $\phi$ generated by the clock signal generator 17 is supplied to the S/H circuit 11 and the A/D converter 13 as a signal which defines the sampling frequency of the input signal x. If the input signal x is the television signal, the frequency of the clock signal $\phi$ is determined to be three times the color subcarrier frequency fsc.

The clock signal generator 17 comprises, for example, a reference oscillator 17-1 for generating the clock signal $\phi$, a first counter 17-2 for frequency dividing the clock signal $\phi$ into three clock signals $\phi 1$, $\phi 2$ and $\phi 3$ of different phases, and a second counter 17-3 for frequency dividing the clock signal $\phi 3$ into three clock signals $\psi 1$, $\psi 2$ and $\psi 3$ of different phases. Therefore, the clock signals $\phi 1$, $\phi 2$ and $\phi 3$ have the frequency $\frac{1}{3}$ that of the clock signal $\phi$. Furthermore, the clock signals $\psi 1$, $\psi 2$ and $\psi 3$ have the frequency $\frac{1}{3}$ of the frequency of the clock signals $\phi 1$, $\phi 2$ and $\phi 3$.

The first arithmetic unit 15 which receives the sampled signal operates in response to the three clock signals $\phi 1$, $\phi 2$ and $\phi 3$ which are generated by the clock signal generator 17. The first arithmetic unit 15 subjects the sampled signal to the orthogonal transform of the order of 3 using as an orthogonal transform coefficient an orthogonal matrix of the order of 3:

$$\begin{pmatrix} a & a & a \\ b & 0 & -b \\ c & -2c & c \end{pmatrix}$$

having given numbers a, b and c as matrix elements. At the input stage of the first arithmetic unit 15 there are three temporary memories 21-1, 21-2 and 21-3 arranged in parallel to each other for cyclically storing the sampled signals in response to clock signals $\phi 1$, $\phi 2$ and $\phi 3$, respectively. These temporary memories 21-1, 21-2 and 21-3 may comprise, for example, latch circuits, and sampled m-bit digital signals are temporarily stored therein. More specifically, a signal x1 sampled at the timing of the clock signal $\phi 1$ is stored in the temporary memory 21-1, a signal x2 sampled at the timing of the clock signal $\phi 2$ is stored in the temporary memory 21-2, and a signal x3 sampled at the timing of the clock signal $\phi 3$ is stored in the temporary memory 21-3. Signals x4, x5, . . . , x9 and so on which are sampled in a similar manner are also cyclically stored in the temporary memories 21-1, 21-2 and 21-3.

At the output stage of the arithmetic unit 15 there are three adders 23-1, 23-2 and 23-3 arranged in parallel to each other for performing addition in response to the clock signal $\phi 3$. Through respective coefficient multipliers 25-1, 25-2 and 25-3 whose coefficients are set to (a, a, a), respectively, the adder 23-1 receives the signals x1, x2 and x3 respectively stored in the temporary memories 21-1, 21-2 and 21-3 so as to obtain an addition result y1. Through respective coefficient multipliers 27-1 and 27-3 whose coefficients are set to (b, −b), respectively, the adder 23-2 receives the signals x1 and x3 respectively stored in the temporary memories 21-1 and 21-3 so as to obtain an addition result y2. Through respective coefficient multipliers 29-1, 29-2 and 29-3 whose coefficients are set to (c, −2c, c), respectively, the adder 23-3 receives the signals x1, x2 and x3 respectively stored in the temporary memories 21-1, 21-2 and 21-3 so as to obtain an addition result y3.

In this manner, when the sampled, time-sequential signals x1, x2 and x3 are applied, the first arithmetic unit 15 stores these signals x1, x2 and x3 in the temporary memories 21-1, 21-2 and 21-3, respectively, and the addition results (transform outputs) y1, y2 and y3 from the adders 23-1, 23-2 and 23-3 are obtained as follows:

$$y1 = a \cdot x1 + a \cdot x2 + a \cdot x3$$

$$y2 = b \cdot x1 - b \cdot x3$$

$$y3 = c \cdot x1 - 2c \cdot x2 + c \cdot x3$$

In other words, the first arithmetic unit 15 performs the operation:

$$\begin{pmatrix} y1 \\ y2 \\ y3 \end{pmatrix} = \begin{pmatrix} a & a & a \\ b & 0 & -b \\ c & -2c & c \end{pmatrix} \cdot \begin{pmatrix} x1 \\ x2 \\ x3 \end{pmatrix}$$

This means that the signals are subjected to the orthogonal transform of the order of 3 taking as a transform coefficient an orthogonal matrix of the order of 3:

$$\begin{pmatrix} a & a & a \\ b & 0 & -b \\ c & -2c & c \end{pmatrix}$$

having given numbers a, b and c as matrix elements.

The outputs of the orthogonal transform of the order of 3 obtained from the first arithmetic unit 15 are supplied to second arithmetic units 19-1, 19-2 and 19-3 which are arranged in parallel to each other. The second arithmetic units 19-1, 19-2 and 19-3 are similar to the configuration of the first arithmetic unit 15; however, they operate in response to the clock signals $\psi 1$, $\psi 2$ and $\psi 3$ in place of the clock signals $\phi 1$, $\phi 2$ and $\phi 3$. The second arithmetic unit 19-1 receives the transform outputs y1, y4 and y7 from the adder 23-1 of the first arithmetic unit 15. Using the orthogonal matrix of the order of 3 as a transform coefficient, the second arithmetic unit 19-1 performs the orthogonal transform:

$$\begin{pmatrix} Y1 \\ Y4 \\ Y7 \end{pmatrix} = \begin{pmatrix} a & a & a \\ b & 0 & -b \\ c & -2c & c \end{pmatrix} \cdot \begin{pmatrix} y1 \\ y4 \\ y7 \end{pmatrix}$$

The second arithmetic unit 19-2 receives the transform outputs y2, y5 and y8 from the adder 23-2 of the first arithmetic unit 15, and performs the orthogonal transform:

$$\begin{pmatrix} Y2 \\ Y5 \\ Y8 \end{pmatrix} = \begin{pmatrix} a & a & a \\ b & 0 & -b \\ c & -2c & c \end{pmatrix} \cdot \begin{pmatrix} y2 \\ y5 \\ y8 \end{pmatrix}$$

Finally, the second arithmetic unit 19-3 receives the transform outputs y3, y6 and y9 from the adder 23-3, and performs the orthogonal transform:

$$\begin{pmatrix} Y3 \\ Y6 \\ Y9 \end{pmatrix} = \begin{pmatrix} a & a & a \\ b & 0 & -b \\ c & -2c & c \end{pmatrix} \cdot \begin{pmatrix} y3 \\ y6 \\ y9 \end{pmatrix}$$

The transform outputs y4 to y9 from the adders 23-1, 23-2 and 23-3 are obtained for the sample signals x4 to x9 in a similar manner as are the transform outputs y1, y2 and y3 which are obtained for the sampled signals x1, x2 and x3.

The signal subjected to the orthogonal transform of degree 3 by the first arithmetic unit 15 is subjected to another orthogonal transform of degree 3 by the second arithmetic units 19-1, 19-2 and 19-3. This means that the time-sequential signals x1 to x9 of the input signal X sampled by the S/H circuit 11 is subjected to the orthogonal transform of the order of 9 to provide nine transform outputs Y1 to Y9:

$$\begin{pmatrix} Y1 \\ Y2 \\ Y3 \\ Y4 \\ Y5 \\ Y6 \\ Y7 \\ Y8 \\ Y9 \end{pmatrix} = \begin{pmatrix} a & a & a & a & a & a & a & a & a \\ a\cdot b & 0 & -b & a\cdot b & 0 & -b & a\cdot b & 0 & -b \\ c & -2c & c & c & -2c & c & c & -2c & c \\ a & a & a & a & a & a & a & a & a \\ b\cdot b & 0 & -b & 0\cdot b & 0 & -b & -b\cdot b & 0 & -b \\ c & -2c & c & c & -2c & c & c & -2c & c \\ a & a & a & a & a & a & a & a & a \\ c\cdot b & 0 & -b & -2c\cdot b & 0 & -b & c\cdot b & 0 & -b \\ c & -2c & c & c & -2c & c & c & -2c & c \end{pmatrix} \cdot \begin{pmatrix} x1 \\ x2 \\ x3 \\ x4 \\ x5 \\ x6 \\ x7 \\ x8 \\ x9 \end{pmatrix}$$

$$\begin{pmatrix} Y1 \\ Y2 \\ Y3 \\ Y4 \\ Y5 \\ Y6 \\ Y7 \\ Y8 \\ Y9 \end{pmatrix} = \begin{pmatrix} a\cdot a & a\cdot a & a\cdot a & a\cdot a & a\cdot a & a\cdot a & a\cdot a & a\cdot a & a\cdot a \\ a\cdot b & 0 & a\cdot(-b) & a\cdot b & 0 & a\cdot(-b) & a\cdot b & 0 & a\cdot(-b) \\ a\cdot c & a\cdot(-2c) & a\cdot c & a\cdot c & a\cdot(-2c) & a\cdot c & a\cdot c & a\cdot(-2c) & a\cdot c \\ b\cdot a & b\cdot a & b\cdot a & 0 & 0 & 0 & (-b)\cdot a & (-b)\cdot a & (-b)\cdot a \\ b\cdot b & 0 & b\cdot(-b) & 0 & 0 & 0 & (-b)\cdot b & 0 & (-b)\cdot(-b) \\ b\cdot c & b\cdot(-2c) & b\cdot c & 0 & 0 & 0 & (-b)\cdot c & (-b)\cdot(-2c) & (-b)\cdot c \\ c\cdot a & c\cdot a & c\cdot a & (-2c)\cdot a & (-2c)\cdot a & (-2c)\cdot a & c\cdot a & c\cdot a & c\cdot a \\ c\cdot b & 0 & c\cdot(-b) & (-2c)\cdot b & 0 & (-2c)\cdot(-b) & c\cdot b & 0 & c\cdot(-b) \\ c\cdot c & c\cdot(-2c) & c\cdot c & (-2c)\cdot c & (-2c)\cdot(-2c) & (-2c)\cdot c & c\cdot c & c\cdot(-2c) & c\cdot c \end{pmatrix} \cdot \begin{pmatrix} x1 \\ x2 \\ x3 \\ x4 \\ x5 \\ x6 \\ x7 \\ x8 \\ x9 \end{pmatrix}$$

If the matrix elements a, b and c are given by "1", respectively, the coefficient of the orthogonal transform is given by the orthogonal matrix:

$$\begin{pmatrix} 1 & 1 & 1 & 1 & 1 & 1 & 1 & 1 & 1 \\ 1 & 0 & -1 & 1 & 0 & -1 & 1 & 0 & -1 \\ 1 & -2 & 1 & 1 & -2 & 1 & 1 & -2 & 1 \\ 1 & 1 & 1 & 0 & 0 & 0 & -1 & -1 & -1 \\ 1 & 0 & -1 & 0 & 0 & 0 & -1 & 0 & 1 \\ 1 & -2 & 1 & 0 & 0 & 0 & -1 & 2 & -1 \\ 1 & 1 & 1 & -2 & -2 & -2 & 1 & 1 & 1 \\ 1 & 0 & -1 & -2 & 0 & 2 & 1 & 0 & -1 \\ 1 & -2 & 1 & -2 & 4 & -2 & 1 & -2 & 1 \end{pmatrix}$$

As shown above, if the orthogonal matrix is given as the transform coefficient, the coefficient multipliers 25-1, 25-2, 25-3, 27-1, 29-1 and 29-3 in the first and second arithmetic units 15, 19-1, 19-2 and 19-3 may be formed of buffer registers. A coefficient multiplier 27-3 comprises a register with a complementer. A coefficient multiplier 29-2 comprises a complementer and a shift register which shifts the input data by one bit to the upper significant bit by one bit to provide a coefficient of 2. Alternatively, the coefficient multiplier 29-2 may complement by a complementer and serve to shift the output from the temporary memory 21-2 by one bit to the upper significant bit and to output the obtained data to the adder 23-3. In this case, it is possible to omit the coefficient multipliers 25-1, 25-2, 25-3, 27-1, 29-1 and 29-3, and to form a circuit to directly supply the data from the temporary memories 21-1, 21-2 and 21-3 to the adders 23-1, 23-2 and 23-3.

Figure 1B:
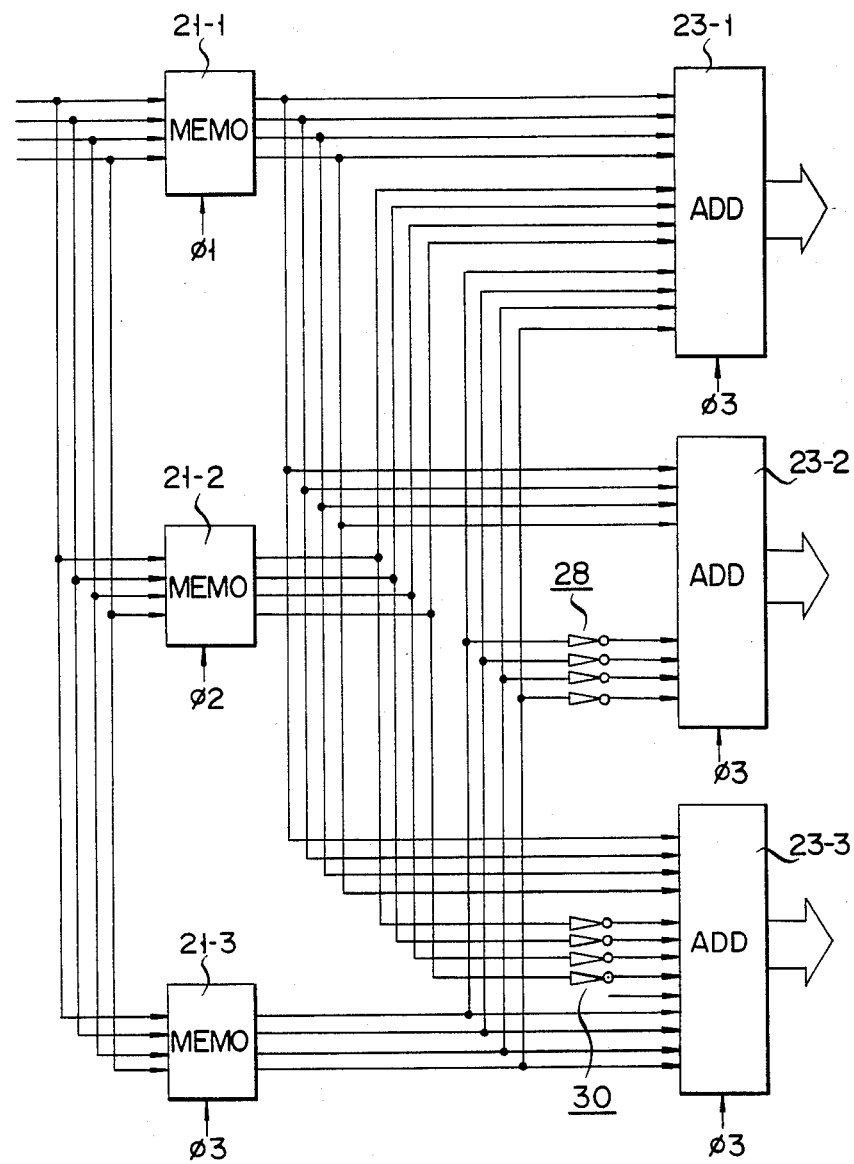
FIG. 1B is a block diagram of a first arithmetic circuit shown in FIG. 1A.

FIG. 1B shows an example of the configuration of the arithmetic units 15, 19-1, 19-2 and 19-3 when the sampled signal is represented by a 4-bit signal having twos complement, and the transform coefficient $$\begin{pmatrix} a & a & a \\ b & 0 & -b \\ c & -2c & c \end{pmatrix}$$

is given by $$\begin{pmatrix} 1 & 1 & 1 \\ 1 & 0 & -1 \\ 1 & -2 & 1 \end{pmatrix}$$

In this case, it is possible to omit coefficient multipliers 25-1, 25-2, 25-3, 27-1, 29-1 and 29-3 in which the coefficient "1" is set, and to form a circuit to directly supply the 4-bit data stored in the temporary memories 21-1, 21-2 and 21-3 to the adders 23-1, 23-2 and 23-3. The coefficient multiplier 27-3 for providing a negative coefficient, "−1" may be realized by supplying the data from the temporary memory 21-3 to the adder 23-2 after inversion by an inverter 28, and by adding 1 to the inverted data at the adder 23-2. The coefficient multiplier 29-2 for providing a negative coefficient "−2" may be realized by inverting the 4-bit output data from the temporary memory 21-2 by an inverter 30, by supplying the inverted data to the input terminals of the adder 23-3 by connection to upper significant bits, leaving the least significant bit vacant as shown in FIG. 1B, so as to substantially double the output data of the inverters, and by adding 2 to the input data at the adder 23-3. Thus, the processing of the coefficient may be performed in a simple manner by connecting the temporary memories 21-1, 21-2 and 21-3 to the adders 23-1, 23-2 and 23-3 in a suitable manner, inverting the data by inverters 28 and 30, and adding 1 and 2 to the data at the adders 23-2 and 23-3, respectively.

The encoder of the configuration as described above performs the orthogonal transform of the input signal using as the transform coefficient an orthogonal matrix of the order of 9 which has, as a minor matrix, an orthogonal matrix of the order of 3:

$$\begin{pmatrix} a & a & a \\ b & 0 & -b \\ c & -2c & c \end{pmatrix}$$

having given numbers a, b and c as matrix elements.

If all the matrix elements a, b and c are given by 1, the characteristics of the transform function are as shown in FIGS. 2A to 2I. If the respective matrix elements a, b and c are any given numbers, only the relative characteristics of the transform function shown in FIGS. 2A to 2I change and the basic characteristics remain unchanged. Therefore, the effects of the encoder of the present invention will now be described with reference to the function characteristics shown in FIG. 2.

As shown in FIG. 2A, the function characteristics to obtain the transform output Y1 correspond to dc components of the input signal. The function characteristics to obtain the transfer outputs Y2 and Y3 correspond to the sine components and the cosine components of a frequency which is $\frac{1}{3}$ of the sampling frequency as shown in FIGS. 2B and 2C. That is, the transform output Y2 is the result of adding the products of the coefficients (1, 0, −1, 1, 0, −1, 1, 0, −1) corresponding to sin (8/3)π, sin 2π, sin (4/3)π, sin (2/3)π, sin 0, sin (−2/3π), sin (−(4/3)π), sin (−2π) and sin (−(8/3)π) with the sampled sine components of the frequency which is $\frac{1}{3}$ of the sampling frequency. Therefore, the transform output Y2 mainly contains the components of the frequency which is $\frac{1}{3}$ of the sampling frequency. The transform output Y3 is the result of adding the products of the sampled signal with the coefficients (1, −2, 1, 1, −2, 1, 1, −2, 1) corresponding to −cos (8/3)π, −cos 2π, −cos (4/3)π, −cos (2/3)π, cos 0, cos (2/3)π, cos (4/3)π, cos 2π and cos (8/3)π. Thus, the transform output Y3 also mainly contains the components of the frequency which is $\frac{1}{3}$ of the sampling frequency. Therefore, the components of the frequency which is $\frac{1}{3}$ of the sampling frequency concentrate in the transform outputs Y2 and Y3 of the orthogonal transform. On the other hand, the function characteristics for obtaining other transform outputs Y4 to Y9 contain components other than the components of the DC and the frequency which is $\frac{1}{3}$ of the sampling frequency and are products of synthesis of many basic characteristic elements. For example, the function characteristics shown in FIGS. 2D and 2G only represent the components of the frequency which is 1/9 of the sampling frequency. As is apparent from this, the function characteristics shown in FIGS. 2A to 2I act to decompose the respective components of the spectrum of the input signal X into a plurality of transform outputs Y1 to Y9 by the orthogonal transform.

When a television signal is subjected to the orthogonal transform by the encoder of the present invention, the output spectrum becomes that as shown in FIG. 3A.

The spectrum characteristics are shown in FIGS. 3A to 3C with the transform outputs Y1 to Y9 aligned in the order corresponding to the number of times the signals shown in FIGS. 2A to 2I change from an increasing value to a decreasing value or vice-versa.

As for the luminance components of the television signal, the spectrum characteristics as shown in FIG. 3B are obtained. As for the chrominance components of the television signal, the spectrum characteristics as shown in FIG. 3C are obtained. Thus, the frequency components of the transform outputs Y2 and Y3 obtained by the orthogonal transform with the functions as shown in FIGS. 2B and 2C mainly show the chrominance components of the television signal which are the components of the frequency which is $\frac{1}{3}$ of the sampling frequency. When this television signal is encoded by the conventional Hadamard transform of the order of 8, the sequence spectrum characteristics become that as shown in FIG. 4A. Thus, the chrominance components are dispersed in many spectrum parts as shown in FIG. 4C. When the chrominance components are represented by the signal dispersed in many spectrum parts, the signal processing becomes significantly complex in procedure. For this reason, there was some reservation for setting the sampling frequency at three times the frequency of the input signal. However, with the encoder of the present invention, the frequency components which are conventionally dispersed as shown in FIG. 4C are concentrated in the transform outputs Y2 and Y3 as shown in FIG. 3C. Therefore, when these transform outputs Y2 and Y3 are extracted as encoding outputs, the chrominance components of the television signal are readily obtained thereby.

According to the encoder of the present invention, the input signal is sampled at a frequency three times that of the input signal, and the sampled signal is subjected to the orthogonal transform using an orthogonal matrix of the order of 3n as a transform function, so that only the components of the frequency which is $\frac{1}{3}$ of the sampling frequency may be concentrated in a small number of transform outputs. Furthermore, the transform outputs other than these small number of transform outputs are hardly dependent on the components of the frequency which is $\frac{1}{3}$ of the sampling frequency.

When the television signal is subjected to the orthogonal transform by the encoder of the present invention, and if the transform outputs Y1, Y4 and Y7 are obtained as the luminance components and if the transform outputs Y2 and Y3 are obtained as the chrominance components, these transform outputs may be obtained as the encoding outputs of the television signal. In this case, if the transform outputs Y5, Y6, Y8 and Y9 are eliminated from the encoding output as the insignificant components of the television signal, the band compression is facilitated in correspondence with the amount of signal component eliminated.

Figure 5A:
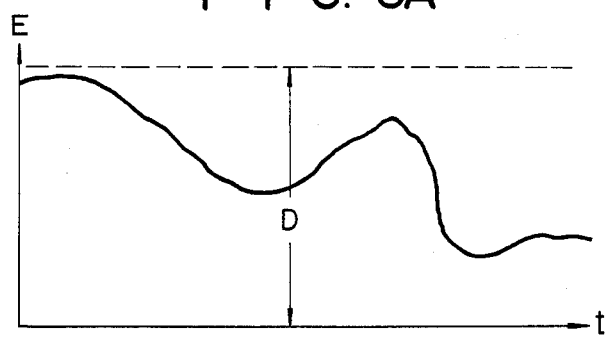
FIGS. 5A and 5B show signal components for explanation of the band compression effects of transform outputs.
Figure 5B:
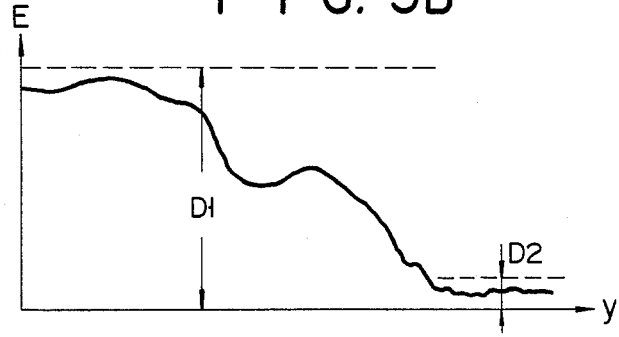

When the input signal is considered in terms of change of power with time as shown in FIG. 5A, encoding must be performed while guaranteeing the dynamic range D which covers the maximum power. In contrast to this, when the input signal is subjected to the orthogonal tranform to be decomposed in the spectrum as shown in FIG. 5B, the dynamic range for the encoding may be narrowed or eliminated as shown by D2 at high in a range where the number of times the signal changes the direction of variation is large. The band compression is thus facilitated, which is the inherent characteristic of the orthogonal transform. In addition to this, according to the orthogonal transform according to the present invention, the components of the frequency which is $\frac{1}{3}$ of the sampling frequency are concentrated into only particular transform outputs and are not dispersed like the conventional case, so that band compression may be performed with higher efficiency.

Figure 6:
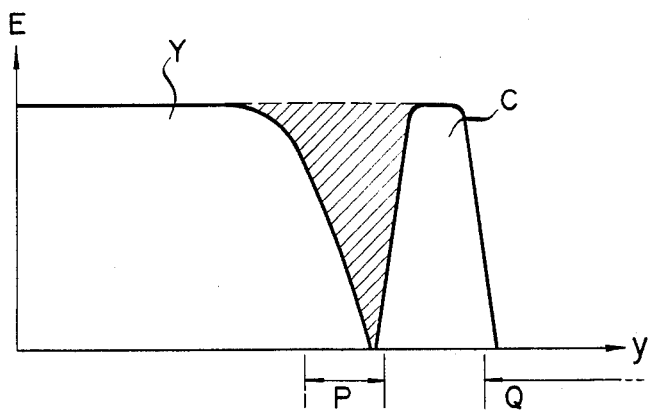
FIG. 6 shows the transform components of a television signal.

When the television signal is encoded by the encoder of the present invention, as shown in FIG. 6, it is not necessary to assign an encoding bit for the transform component P, indicated by the hatched lines, which is located between the luminance components Y and the chrominance components C in FIG. 6. It is furthermore possible to eliminate the redundancy in encoding. This is done by suppressing to zero the dynamic range of the transform components Q in which the number of times the signal level changes the direction of variation is larger than that of the chrominance components. This further facilitates the band compression. Accordingly, with the encoder of the present invention, the band compression by the orthogonal transform of the input signal may be performed in a simple manner and with high efficiency without requiring setting of the sampling frequency to an undesirably high value and without requiring a higher speed for the transform operation.

The orthogonal transform is performed using, as a transform coefficient, an orthogonal matrix of the order of 3n having as a minor matrix an orthogonal matrix of the order of 3:

$$\begin{pmatrix} a & a & a \\ b & 0 & -b \\ c & -2c & c \end{pmatrix}$$

having given numbers a, b and c as matrix elements. However, if the properties of the minor matrix described above are to be maintained, the orthogonal matrix obtained with its columns or rows exchanged may be utilized as the minor matrix. Thus, the orthogonal matrices obtained by exchanging the rows of the minor matrix described above may be utilized as the minor matrices as follows:

$$\begin{pmatrix} a & a & a \\ c & -2c & c \\ b & 0 & -b \end{pmatrix}, \begin{pmatrix} b & 0 & -b \\ a & a & a \\ c & -2c & c \end{pmatrix}, \begin{pmatrix} b & 0 & -b \\ c & -2c & c \\ a & a & a \end{pmatrix}$$

Furthermore, the orthogonal matrices obtained by exchanging the columns of the minor matrix as described above may be utilized as the minor matrices as follows:

$$\begin{pmatrix} a & a & a \\ 0 & b & -b \\ -2c & c & c \end{pmatrix}, \begin{pmatrix} a & a & a \\ -b & b & 0 \\ c & c & -2c \end{pmatrix}, \begin{pmatrix} a & a & a \\ -b & 0 & b \\ c & -2c & c \end{pmatrix}$$

It is also possible to utilize as the minor matrices the orthogonal matrices obtained by exchanging the rows and columns as follows:

$$\begin{pmatrix} -2c & c & c \\ a & a & a \\ 0 & b & -b \end{pmatrix}, \begin{pmatrix} c & c & -2c \\ -b & b & 0 \\ a & a & a \end{pmatrix}, \begin{pmatrix} a & a & a \\ -2c & c & c \\ 0 & -b & b \end{pmatrix}$$

In this manner, 36 orthogonal matrices obtained by exchanging the column and/or rows may be respectively used as the minor matrix of the orthogonal matrix of the order of 3n.

Figure 7:
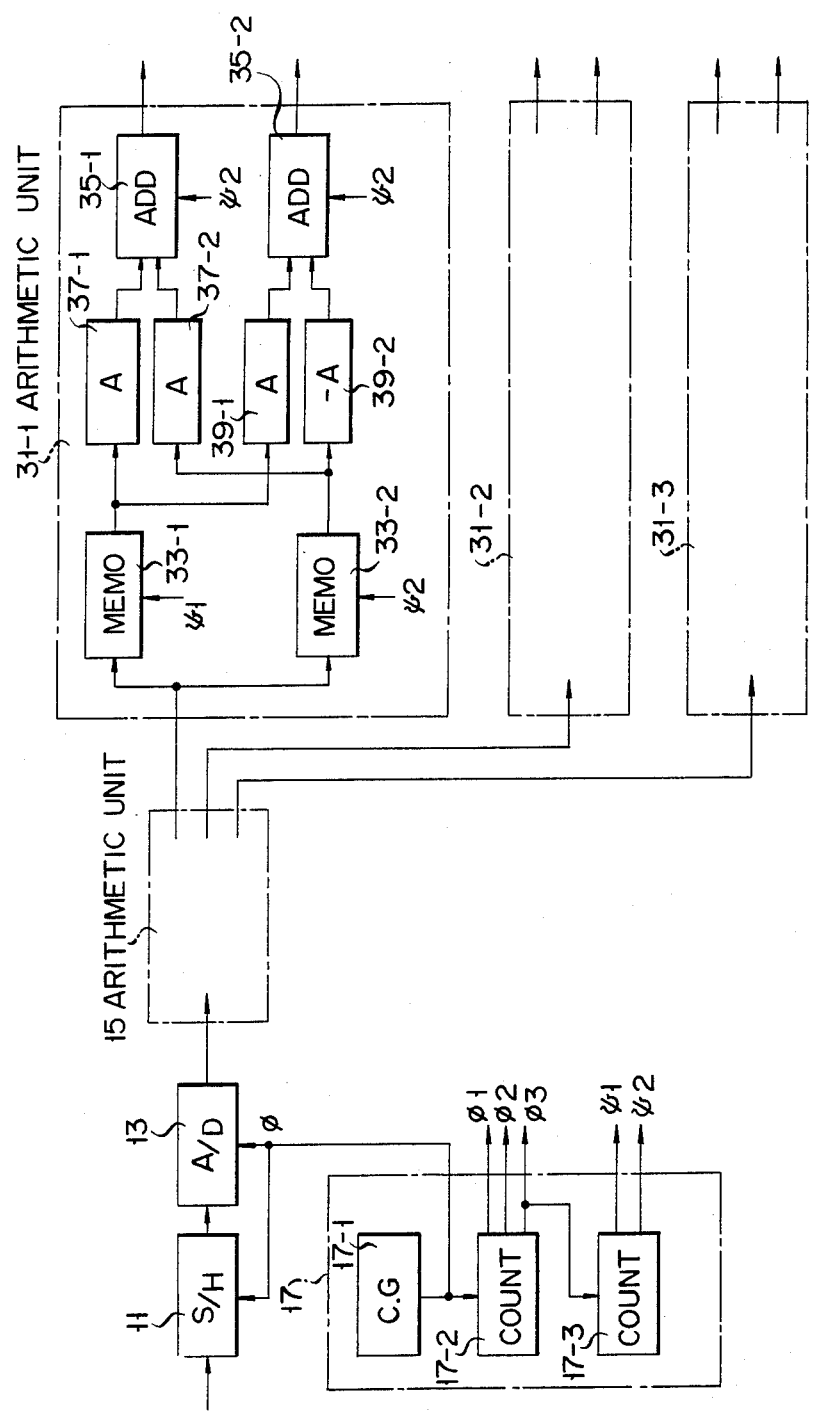
FIG. 7 is a block diagram of an encoder for performing the orthogonal transform of degree 6 according to the present invention.

The above description has been made with reference to the case of the orthogonal transform of the order of 9. The orthogonal transform when n=2, that is, the orthogonal transform of the order of 6 is performed in the manner to be described below. FIG. 7 shows an example of the orthogonal transform of the order of 6. Referring to FIG. 7, the outputs from the first arithmetic unit 15 for performing the operation of the minor matrix are supplied to second arithmetic units 31-1, 31-2 and 31-3 which perform the orthogonal transform of the order of 2. These second arithmetic units 31-1, 31-2 and 31-3 have the orthogonal matrices of the order of 2 as transform coefficients. The second arithmetic units 31-1, 31-2 and 31-3 comprise two temporary memories 33-1 and 33-2, two adders 35-1 and 35-2, and coefficient multipliers 37-1, 37-2, 39-1 and 39-2 which multiply the data added by the adders 35-1 and 35-2 by the coefficients. The temporary memories 33-1 and 33-2 perform the latching operation in response to the clock signal $\psi 1$ and $\psi 2$. The adders 35-1 and 35-2 perform the addition operation in response to the clock signal $\psi 2$, and operate in substantially the same manner as the first arithmetic unit 15. When the second arithmetic units 31-1, 31-2 and 31-3 have the orthogonal matrices of the order of 2, for example, the Hadamard matrices as coefficients, the coefficient multipliers 37-1, 37-2, 39-1 and 39-2 have, as coefficients, the respective elements of a matrix:

$$\begin{pmatrix} 1 & 1 \\ 1 & -1 \end{pmatrix}$$

This may be realized by omitting the coefficient multipliers 37-1, 37-2 and 39-1 and constituting the coefficient multiplier 39-2 by a complementer. In the encoder of this configuration, the orthogonal transform as shown below is performed:

$$\begin{pmatrix} Y1 \\ Y2 \\ Y3 \\ Y4 \\ Y5 \\ Y6 \end{pmatrix} = \begin{pmatrix} a & a & a & a & a & a \\ b & 0 & -b & b & 0 & -b \\ c & -2c & c & c & -2c & c \\ a & a & a & -a & -a & -a \\ b & 0 & -b & -b & 0 & b \\ c & -2c & c & -c & 2c & -c \end{pmatrix} \cdot \begin{pmatrix} x1 \\ x2 \\ x3 \\ x4 \\ x5 \\ x6 \end{pmatrix}$$

In this case, the dc components appear in the transform output Y1, the sine components of the frequency which is ⅓ of the sampling frequency appear in the transform output Y2, and the cosine components appear in the transform output Y3, respectively. Therefore, as in the case of the orthogonal transform of the order of 9, the components of the frequency which is ⅓ of the sampling frequency are concentrated in Y2 and Y3 transform outputs. Therefore, it becomes possible to sample the input signal at a sampling frequency three times that of the input signal and to perform the orthogonal transform for band compression and encoding. It is also possible to adopt orthogonal matrices other than the Hadamard matrix described above.

Since the orthogonal transform matrix of the order of 3n has as the minor matrix an orthogonal matrix of the order of 3:

$$\begin{pmatrix} a & a & a \\ b & 0 & -b \\ c & -2c & c \end{pmatrix}$$

the transform characteristics of the minor matrix are effective throughout the entire transform matrix. Therefore, when the input signal is sampled at a sampling frequency three times that of the input signal, it is possible to effectively subject the sampled signal to the orthogonal transform for band compression and encoding. According to the prior art, when the input signal is sampled at a sampling frequency three times that of the input signal and subjected to the orthogonal transform, the frequency components disperse in many transform outputs. This problem is solved according to the encoder of the present invention. The encoder of the present invention achieves excellent effects of concentration of the frequency components of the input signal in only a small number of transform outputs, so that the band compression and encoding are performed effectively. The present invention simultaneously provides an orthogonal transform system of the order of 3n which has excellent practical value since the components of the frequency which is ⅓ of the sampling frequency may be effectively subjected to the orthogonal transform. The present invention has thus marked an important step in the orthogonal encoding technique.

In order to decode the signal encoded by the orthogonal transform as described above, the inverse matrix of the orthogonal transform matrix is used as the inverse transform coefficient. The inverse matrix of the unit matrix of the order of 3:

$$\begin{pmatrix} 1 & 1 & 1 \\ 1 & 0 & -1 \\ 1 & -2 & 1 \end{pmatrix}$$

is represented by:

$$\frac{1}{6}\begin{pmatrix} 2 & 3 & 1 \\ 2 & 0 & -2 \\ 2 & -3 & 1 \end{pmatrix}$$

In order to decode the signal which is subjected to the orthogonal transform of the order of 9 in which all the matrix elements a, b and c are represented by "1", it suffices to use as an orthogonal transform coefficient for the inverse transform an inverse matrix as follows:

$$\frac{1}{36}\begin{pmatrix} 4 & 6 & 2 & 6 & 9 & 3 & 2 & 3 & 1 \\ 4 & 0 & -4 & 6 & 0 & -6 & 2 & 0 & -2 \\ 4 & -6 & 2 & 6 & -9 & 3 & 2 & -3 & 1 \\ 4 & 6 & 2 & 0 & 0 & 0 & -4 & -6 & -2 \\ 4 & 0 & -4 & 0 & 0 & 0 & -4 & 0 & 4 \\ 4 & -6 & 2 & 0 & 0 & 0 & -4 & 6 & -2 \\ 4 & 6 & 2 & -6 & -9 & -3 & 2 & 3 & 1 \\ 4 & 0 & -4 & -6 & 0 & 6 & 2 & 0 & -2 \\ 4 & -6 & 2 & -6 & 9 & -3 & 2 & -3 & 1 \end{pmatrix}$$

In this manner, since the encoding and decoding may be accomplished with the orthogonal transform coefficients, an orthogonal matrix and its inverse matrix, desired band compression and encoding and decoding may be performed in a simple manner.

The order of the orthogonal transform is not limited to 6 to 9 described above, and may be performed by an orthogonal matrix of the order of 3n if n is an integer larger than unity. In this case, an orthogonal matrix of the order of 3:

$$\begin{pmatrix} a & a & a \\ b & 0 & -b \\ c & -2c & c \end{pmatrix}$$

is utilized as the minor matrix.

In summary, according to the encoder of the present invention, the input signal may be easily and effectively band compressed and encoded by the orthogonal transform of the order of 3n by setting the sampling frequency at as low as three times that of the input signal. The effects obtained with the encoder of the present invention are not comparable to the prior art encoders.

What we claim is:

1. An encoder comprising:
   means for sampling an input signal at a sampling frequency three times the frequency of the input signal to obtain a sampled signal, and
   orthogonal transform means for concentrating the frequency components of the input signal into transform outputs by subjecting the sampled signal to an orthogonal transform using an orthogonal matrix function of the order of 3n (where n is an integer larger than unity), said orthogonal transform means performing the orthogonal transform using as a coefficient an orthogonal matrix of the order of 3n which has as a minor matrix an orthogonal matrix M of the order of 3 having given numbers a, b and c as matrix elements and defined as:

$$M = \begin{pmatrix} a & a & a \\ b & 0 & -b \\ c & -2c & c \end{pmatrix},$$

wherein said orthogonal transform means includes first means for performing an arithmetic operation of the following minor matrix arithmetic operation, $$\begin{pmatrix} y1 \\ y2 \\ y3 \end{pmatrix} = \begin{pmatrix} a & a & a \\ b & 0 & -b \\ c & -2c & c \end{pmatrix} \cdot \begin{pmatrix} x1 \\ x2 \\ x3 \end{pmatrix},$$

where y1 to y3 are transform outputs, and x1 to x3 are first to third sampled signals respectively sampled at different timings by clock signals each having a frequency one third that of the input signal sampling frequency.

2. An encoder according to claim 1, wherein said arithmetic operation performing means includes, first to third memory means for respectively storing and outputting said first to third sampled signals (x1 to x3), a plurality of coefficient multipliers for multiplying said first to third sampled signals (x1 to x3) by the matrix elements a, b and c of said orthogonal matrix M, $$M = \begin{pmatrix} a & a & a \\ b & 0 & -b \\ c & -2c & c \end{pmatrix},$$

and first to third adders for adding predetermined outputs of said coefficient multipliers.

3. An encoder according to claim 2, wherein said matrix elements a, b and c are given to have a value of "1" to define an orthogonal matrix $$\begin{pmatrix} 1 & 1 & 1 \\ 1 & 0 & -1 \\ 1 & -2 & 1 \end{pmatrix}.$$

4. An encoder according to claim 3, wherein coefficient multipliers which are given a coefficient of "1" are buffer circuits.

5. An encoder according to claim 1, wherein said orthogonal transform means further comprises second means for performing an orthogonal transform of the order of $2^k$ (where k is an integer of two or more) using outputs of first arithmetic operation performing means.

6. An encoder according to claim 5, wherein said second means is constituted to perform an orthogonal transform of the order of $2^2$, $$\begin{pmatrix} y1 \\ y2 \\ y3 \\ y4 \\ y5 \\ y6 \end{pmatrix} = \begin{pmatrix} M & M \\ M & -M \end{pmatrix} \cdot \begin{pmatrix} x1 \\ x2 \\ x3 \\ x4 \\ x5 \\ x6 \end{pmatrix}$$

7. An encoder according to claim 1, wherein said orthogonal transform means further comprises second means for performing an orthogonal transform of the order of $3^k$ (where k is an integer of two or more) using outputs of said first arithmetic operation performing means.

8. An encoder according to claim 7, wherein said second means is constituted to perform an orthogonal transform of the order of $3^2$, $$\begin{pmatrix} y1 \\ y2 \\ y3 \\ y4 \\ y5 \\ y6 \\ y7 \\ y8 \\ y9 \end{pmatrix} = \begin{pmatrix} M & M & M \\ M & 0 & -M \\ M & -2M & M \end{pmatrix} \cdot \begin{pmatrix} x1 \\ x2 \\ x3 \\ x4 \\ x5 \\ x6 \\ x7 \\ x8 \\ x9 \end{pmatrix}$$

\* \* \* \* \*